United States Patent
Liu et al.

(10) Patent No.: US 9,203,740 B2
(45) Date of Patent: Dec. 1, 2015

(54) AUTOMATED NETWORK FAULT LOCATION

(71) Applicant: GlobalFoundries U.S. 2 LLC, Hopewell Junction, NY (US)

(72) Inventors: Yulei Liu, St Leonards (AU); Daniel Joseph Martin, Pawling, NY (US); Piyush Sarwal, Leawood, KS (US)

(73) Assignee: GlobalFoundries Inc., Grand Cayman (KY)

( * ) Notice: Subject to any disclaimer, the term of this patent is extended or adjusted under 35 U.S.C. 154(b) by 124 days.

(21) Appl. No.: 13/945,348

(22) Filed: Jul. 18, 2013

(65) Prior Publication Data

US 2015/0023151 A1 Jan. 22, 2015

(51) Int. Cl.
*H04L 12/26* (2006.01)
*H04L 12/703* (2013.01)

(52) U.S. Cl.
CPC ...................................... *H04L 45/28* (2013.01)

(58) Field of Classification Search
None
See application file for complete search history.

(56) References Cited

U.S. PATENT DOCUMENTS

| | | | |
|---|---|---|---|
| 6,041,037 A * | 3/2000 | Nishio et al. | 370/228 |
| 6,154,448 A | 11/2000 | Petersen et al. | |
| 6,763,380 B1 * | 7/2004 | Mayton et al. | 709/224 |
| 7,043,661 B2 | 5/2006 | Valadarsky et al. | |
| 7,778,165 B2 | 8/2010 | Madhyastha et al. | |
| 8,223,656 B2 | 7/2012 | Rius i Riu et al. | |
| 8,255,524 B2 | 8/2012 | Devitt | |
| 2005/0018647 A1 * | 1/2005 | Lebrun et al. | 370/351 |
| 2010/0034098 A1 | 2/2010 | Wang et al. | |
| 2012/0093005 A1 | 4/2012 | Li et al. | |
| 2013/0311832 A1 * | 11/2013 | Lad et al. | 714/37 |

OTHER PUBLICATIONS

Wikipedia, traceroute, Feb. 24, 2004-May 11, 2015, https://web.archive.org/web/20121115103608/http://en.wikipedia.org/wiki/Traceroute.

* cited by examiner

*Primary Examiner* — Kwang B Yao
*Assistant Examiner* — Juvena Loo

(57) ABSTRACT

A method, system, and computer program product for locating a network fault are provided in the illustrative embodiments. A set of network probes is configured to execute at a corresponding set of networking components in a data network. A set of events is received. An event in the set of events includes a list of network probes in an order those network probes are visited, the list of network probes forming a path in a set of paths. A test is performed to determine whether a fault condition is present in any of the paths. Those paths are selected, as a set of candidate paths, where the fault condition is present. At least one segment of a specified length is located that is common to a threshold number of paths in the set of candidate paths. The located segment is suggested as the location of the network fault.

18 Claims, 6 Drawing Sheets

AUTOMATED NETWORK FAULT LOCATION

TECHNICAL FIELD

The present invention relates generally to a method, system, and computer program product for managing a data network in a data processing environment. More particularly, the present invention relates to a method, system, and computer program product for automated network fault location in a data processing environment.

BACKGROUND

A presently used data network (network) includes numerous networking components and data communication paths (links) there-between. To reach from one point in the network to another, such as from one application on one data processing system to a service provided by another data processing system, data, such as in the form of packets, has to traverse several networking components and links.

Quality of service provided by a network or a portion thereof depends on several factors. For example, the quality of service between two points in a given network can degrade below a threshold indicator of quality due to a failure in a networking component or a link. As another example, the quality of service between two points in one portion of a given network can degrade below a threshold indicator of quality because a networking component or a link has failed in another portion of the network and the data traffic from that other portion is flowing through the first portion causing congestion and other performance degrading problems.

A networking component sending out of order packets, e.g., in a route flapping scenario, can also lead to below threshold quality of service in a network. External events, such as bust of network traffic due to unusual demand for a service, or maintenance or shutdown in a part of the network, can also lead to quality of service issues. Poor capacity planning in the design of the network can cause quality of service degradation under the right circumstances.

SUMMARY

The illustrative embodiments provide a method, system, and computer program product for automated network fault location. An embodiment configures, using a processor and a memory, a set of network probes to execute at a corresponding set of networking components in a data network. The embodiment receives a set of events, wherein an event in the set of events includes a list of network probes in an order those network probes are visited, the list of network probes forming a path in a set of paths. The embodiment performs a test to determine whether a fault condition is present in any of the paths in the set of paths. The embodiment selects those paths, as a set of candidate paths, where the fault condition is present. The embodiment locates at least one segment of a specified length that is common to a threshold number of paths in the set of candidate paths. The embodiment suggests the at least one segment as the location of the network fault.

Another embodiment includes one or more computer-readable tangible storage devices. The embodiment further includes program instructions, stored on at least one of the one or more storage devices, to configure, using a processor and a memory, a set of network probes to execute at a corresponding set of networking components in a data network. The embodiment further includes program instructions, stored on at least one of the one or more storage devices, to receive a set of events, wherein an event in the set of events includes a list of network probes in an order those network probes are visited, the list of network probes forming a path in a set of paths. The embodiment further includes program instructions, stored on at least one of the one or more storage devices, to perform a test to determine whether a fault condition is present in any of the paths in the set of paths. The embodiment further includes program instructions, stored on at least one of the one or more storage devices, to select those paths, as a set of candidate paths, where the fault condition is present. The embodiment further includes program instructions, stored on at least one of the one or more storage devices, to locate at least one segment of a specified length that is common to a threshold number of paths in the set of candidate paths. The embodiment further includes program instructions, stored on at least one of the one or more storage devices, to suggest the at least one segment as the location of the network fault.

Another embodiment includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to configure, using a processor and a memory, a set of network probes to execute at a corresponding set of networking components in a data network. The embodiment further includes program instructions, stored on at least one of the one or more storage devices for execution by at least one of the one or more processors via at least one of the one or more memories, to receive a set of events, wherein an event in the set of events includes a list of network probes in an order those network probes are visited, the list of network probes forming a path in a set of paths. The embodiment further includes program instructions, stored on at least one of the one or more storage devices for execution by at least one of the one or more processors via at least one of the one or more memories, to perform a test to determine whether a fault condition is present in any of the paths in the set of paths. The embodiment further includes program instructions, stored on at least one of the one or more storage devices for execution by at least one of the one or more processors via at least one of the one or more memories, to select those paths, as a set of candidate paths, where the fault condition is present. The embodiment further includes program instructions, stored on at least one of the one or more storage devices for execution by at least one of the one or more processors via at least one of the one or more memories, to locate at least one segment of a specified length that is common to a threshold number of paths in the set of candidate paths. The embodiment further includes program instructions, stored on at least one of the one or more storage devices for execution by at least one of the one or more processors via at least one of the one or more memories, to suggest the at least one segment as the location of the network fault.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
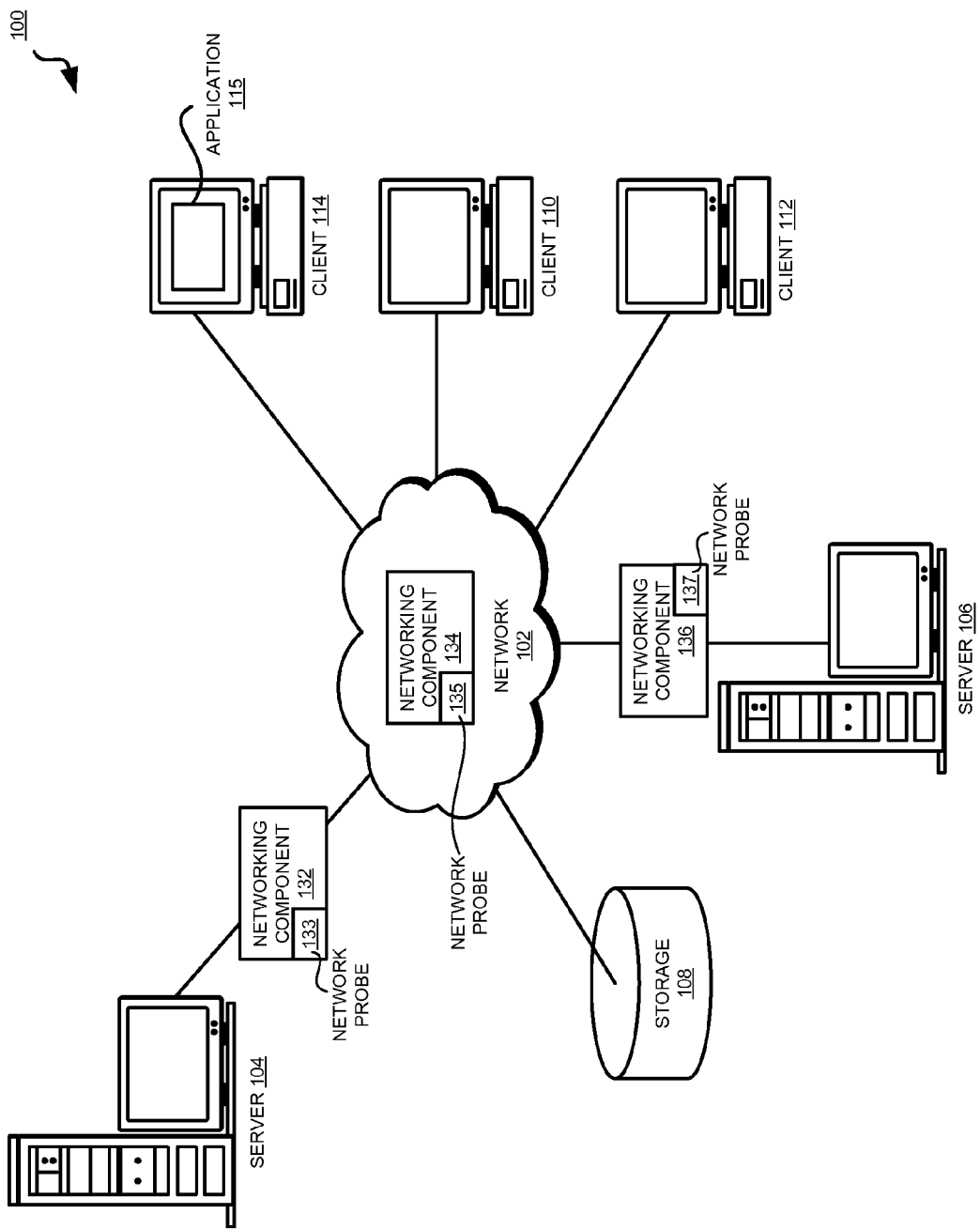
FIG. 1 depicts a pictorial representation of a network of data processing systems in which illustrative embodiments may be implemented.

The illustrative embodiments recognize that a network topology is complex, and knowing all the paths through a network is a difficult problem to solve. The problems becomes even harder when the network topology is subject to change at any given time, such as due to networking components or links going offline for any reason.

A condition that degrades the performance or quality of service of a network or a portion thereof is generally referred to as a fault within the scope of the illustrative embodiments. A fault can occur in any part of a given network for any reason within the scope of the illustrative embodiments. The illustrative embodiments recognize that even if significant computing resources and time were expended to learn a network's topology, isolating the location of a fault is a non-trivial problem. Finding the location of a fault in a network is desirable because remedying the fault cannot begin until the fault has been located.

The illustrative embodiments used to describe the invention generally address and solve the above-described problems and other problems related to locating faults in a network. The illustrative embodiments provide a method, system, and computer program product for automated network fault location in a data processing environment.

A network probe sends data packets through a path in the network and receives the data packets back. Based on the received data packets, or absence thereof, the network probe raises an event in the network. The network probe encodes the path information in the event data.

In one embodiment, a network probe is a software application that can be implemented or instantiated in a networking component or another data processing system in the network. In another embodiment, a network probe is a combination of hardware and software, such as firmware, in a networking component or another data processing system in the network.

A path in a network is a sequence of points in the network. A point in a network is a networking component or another data processing system, an application executing therein, or a part thereof. A point in the network is uniquely identifiable in the network, such as by using a network-wide unique identifier for a give point.

As an example, a network probe can serve as a point in a network. In one embodiment, a path is a sequence of network probes located in the network. A list of identifiers associated with the probes, where the identifiers of the probes are listed in the order they are visited in a path is called a path vector. The segment of a path vector (segment) comprises two consecutive identifiers in the path vector. As an example, in a path vector that includes probe identifiers, a link from probe "A" to probe "B" forms a segment. As another example, in a path vector that includes probe identifiers, a portion of the network that includes a combination of links, networking components, and data processing systems intervening between probe "A" and probe "B" on a path, forms a segment. Generally, network entities intervening between two consecutive path vectors collectively form a segment.

Faults such as latency, jitter, and packet loss (LJL faults) are not measured at a particular point in a given network but along a path in the network. Presently, faults are located based on learning the network topology, acquiring the metrics of the devices in the topology, and attempting to qualitatively match the fault characteristics to the metrics of the devices. In other words, the presently available fault isolation methods attempt to isolate the fault to a device.

Isolating the fault to a path or a segment in the path according to an illustrative embodiment is faster and more desirable. Furthermore, an illustrative embodiment can overlay a network of network probes on any given network topology such that the underlying network topology, even if changed, need not be known. Thus, isolating the fault to a path or segment of the path where the path vector includes network probes is further desirable because the fault isolation exercise becomes independent of the state of the network topology.

According to an illustrative embodiment, once the fault has been isolated to a segment between two probes, only the networking entities existing on the part of the topography between the two probes has to be determined. Determining the network topography of a fraction of the network is much faster and less expensive as compared to determining the entire network topology. Locating the fault to one or more networking entities in that portion of the topography according to an embodiment is therefore significantly more cost-effective than the presently available methods of fault location.

The illustrative embodiments are described with respect to certain data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
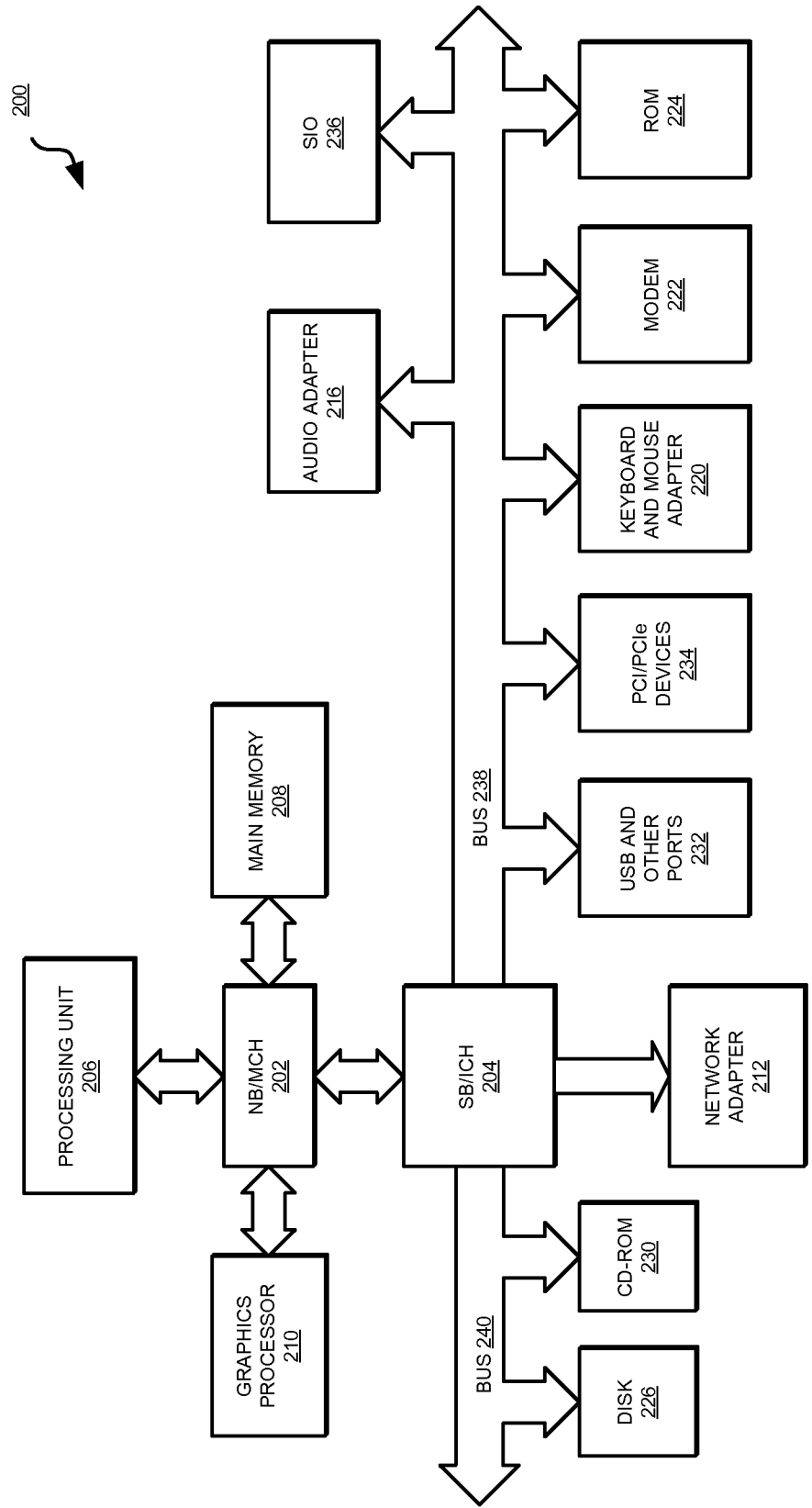
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are typically used in networks. For example, networking components 132, 134, and 136 include network probes 133, 135, and 137, respectively, according to an embodiment. Without implying any limitation thereto, routers, switches, and hubs are some examples of networking components 132, 134, and 136. A path vector includes the identifiers of networking components 132, 134, and 136 in some order depending on the direction of the data flow and the order of the probes visited. Other data processing systems in data processing environment 100, such as servers 104, 106, clients 114, 116, can also similarly include network probes (not shown) and participate in a path. Application 115 in client 114 implements an embodiment for automated network fault location described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 115 in FIG. 1, or any of network probes 133, 135, or 137 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
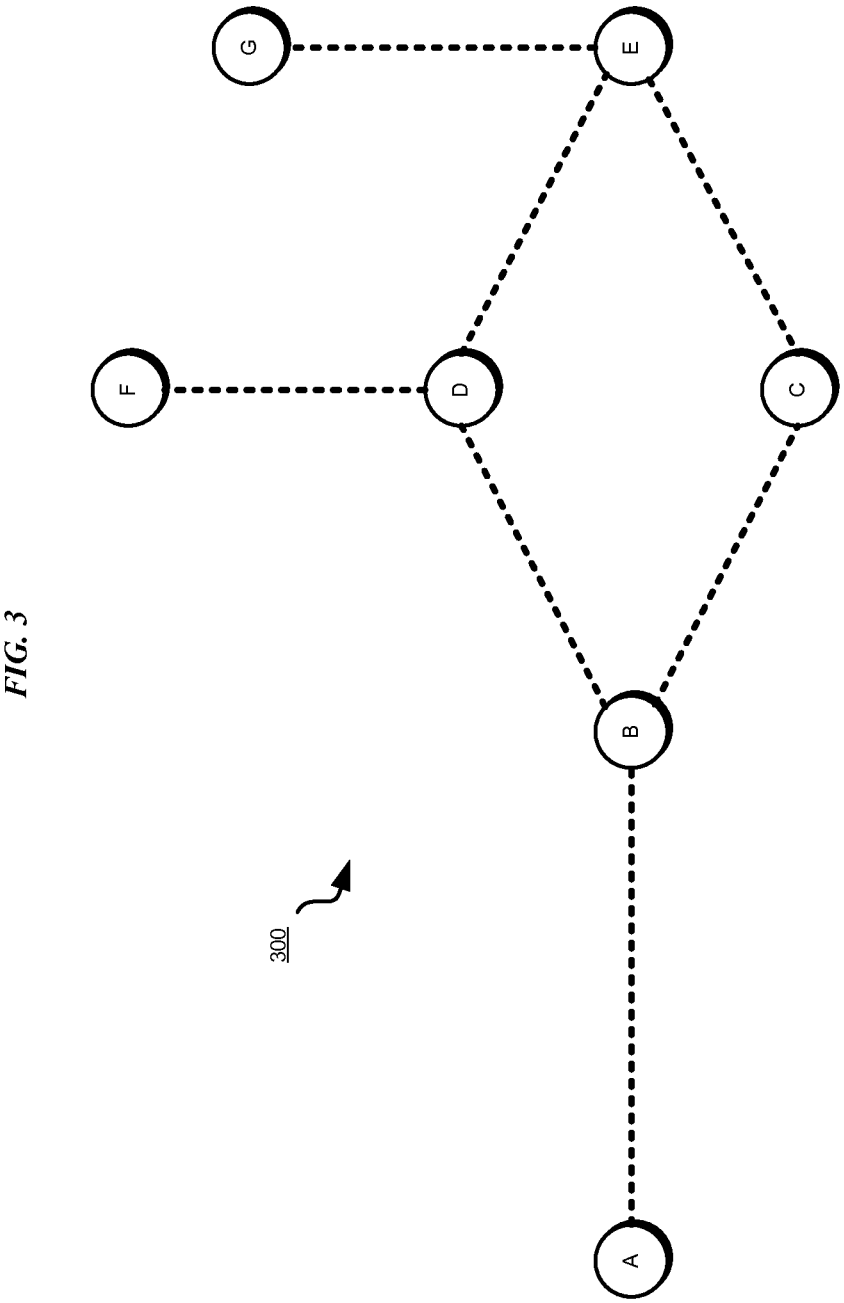
FIG. 3 depicts a block diagram of a configuration of network probes for automated network fault location in accordance with an illustrative embodiment.

With reference to FIG. 3, this figure depicts a block diagram of a configuration of network probes for automated network fault location in accordance with an illustrative embodiment. Network 300 is an example configuration of a limited number of network probes with example identifiers "A", "B", "C", "D", and "E". The dotted lines between the probes represent segments.

As an example, path vector ABCEG is a path starting from probe A, to probe B, to probe C, to probe G, and finally to probe E. AB is a segment in example path vectors ABCEG, ABC, ABDF, ABDE, and ABDEG.

Events in network 300 can occur in many forms and for many reasons. As described earlier, events in a network include within their data an ordered list of paths, e.g., a path vector, along with other information. An event can be a result of an operation performed or a command executed by an entity in a network. For example, a network probe, such as any of probes A, B, C, D, E, F, and G, or an embodiment, such as application 115 in FIG. 1, can perform a Traceroute operation. Traceroute operation returns a path vector that includes an ordered list of the identifiers of entities the Traceroute packet traversed.

For example, Traceroute from probe A can traverse, and report, path vectors AB, ABC, ABCE, ABCEG, ABCED, ABCEDF, ABD, ABDF, ABDE, ABDEG, and ABDEC without introducing a loop. Similarly, Traceroute from probes B, C, D, E, F, and G can report several other path vectors. Thus, a set of paths and their corresponding path vectors are available given a network of probes, such as network 300 of probes A, B, C, D, E, F, and G An embodiment sorts the set of paths according to the lengths of the path vectors, according to an order in which the identifiers appear in the path vectors, or a combination thereof. For example, the set of paths can be sorted such that path vectors of length 2 appear at the top in alphabetical or another order, and the path vectors of length 3 appear thereafter, and so one. Alternatively, the set of paths can be sorted such that path vectors starting with probe A occur first in the order of their lengths and order of probes visited, and progressing in alphabetical or another order thereafter.

A test can be performed to determine whether a path segment is responsive. Path Echo Test (PET) is an example of such a test that reports whether a path segment, such as a link, is responsive or down. A test can be performed to determine whether a path segment is experiencing undesirable performance. Latency, Jitter, and Loss Test (LJL Test) is an example of such a test that reports whether a path segment, such as a link, is performing below a threshold level of performance.

Assume that a link between probes D and E goes offline at time T0. At a time after T0, such as at time T1, an embodiment, such as in application 115 in FIG. 1, performs a test, such as PET, to determine whether a path segment is responsive or down. At another time, such as at time T2, an embodiment, such as in application 115 in FIG. 1, performs a test, such as LJL Test, to determine whether a path segment is experiencing undesirable performance.

In one embodiment, only the test for responsiveness of path segments is performed. In another embodiment, only the test for performance characteristics of a path segment is performed. In another embodiment, both tests are performed. One or both tests can be performed, for example, from an implementation of a key performance indicator (KPI) testing tool, a key quality indicator (KQI) testing tool, or a combination thereof, operating within or in conjunction with application 115. Performance of one or more iterations of a test results in one or more events that include information about one or more path vectors used in that test iteration.

Figure 4:
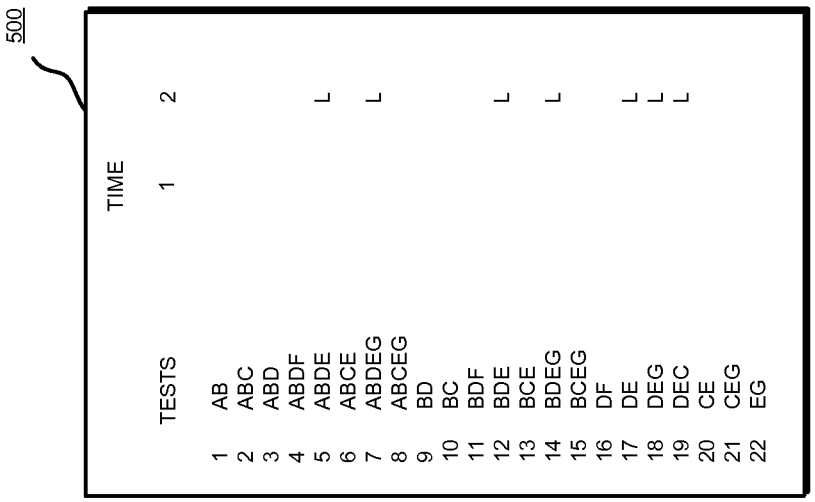
FIG. 4 depicts a table of example results of tests performed for automated network fault location in accordance with an illustrative embodiment.

With reference to FIG. 4, this figure depicts a table of example results of tests performed for automated network fault location in accordance with an illustrative embodiment. Table 400 can be constructed from the results of the tests performed by application 115 in FIG. 1, as described in FIG. 3.

Results of the tests are sorted and recorded by row numbers in table 400. Table 400 shows at row 5 that path ABDE has a non-responsiveness problem (P) somewhere in that path. For example, a PET on path ABDE has reported a failure in that path. Row 5 also shows that path ABDE also has a performance issue (L) in that path. For example, a LJL test on path ABDE has reported a latency, jitter, or packet loss in that path.

Rows 7, 12, 14, 17, 18, and 19 also show both problems in their respective paths. Rows 6, 8, 13, 15, 20, and 21 show only a performance problem in their respective paths. Remainder rows indicate normal results from the tests in their respective paths.

An embodiment, such as application 115 in FIG. 1, analyzes table 400. For example, the application looks for the smallest segments, to with, a segment of length 2, finds that in rows where table 400 has either a responsiveness problem, a performance problem, or both, segments AB, DE, BD, BC, CE, and EG are present.

In one embodiment, the application sets a threshold where a segment is considered as a possible location of a fault if the segment appears to have a problem greater than a threshold number of times in table 400 over a period. For example, assume that the threshold is 5. Segment AB appears four times—in rows 5, 6, 7, and 8, with some problem P, L, or both. Likewise, segment DE appears seven times—in rows 5, 7, 12, 14, 17, 18, and 19; segment BD appears four times—in rows 5, 7, 12, and 14; segment BC appears four times—in rows 6, 8, 13, and 15; segment CE appears six times—in rows 6, 8, 13, 15, 20, and 21; and segment EG appears six times—in rows 7, 8, 14, 15, 18, and 21.

Further assume that probe E is proximate to a data processing system that is providing a service that its accessed from a client at a data processing system proximate to probe A. Assume that a network fault was reported during this access from A to E that gave rise to the creation of table 400.

With this knowledge, the application according to an embodiment discards segment E.G. as a possible location of the fault because that segment does not lie in any path that starts from probe A to ends at probe E. This elimination leaves only two candidates for fault location—segment CE and segment DE—which exceed the threshold of 5.

In one embodiment, the application suggests the segment with the higher number of appearances in table 400 with a problem as the candidate for fault location—here, segment DE. In another embodiment, the application suggests all the segments that exceed the threshold as possible fault locations—here, segments CE and DE.

Suppose that segments BD and DE had come out as candidate fault locations (not in depicted table 400) instead of segments CE and DE as shown in table 400. In another embodiment, the application selects that segment which includes the probe proximate to the service that is affected by the fault, to with, closest to probe E. If segments BD and DE were candidates, the application suggests segment DE as the candidate fault location due to including probe E or being closest to probe E.

While the embodiments are described with respect to segments of a specific lengths, specific thresholds, directions, proximities, and problems, other combinations of additional or different lengths, thresholds, directions, proximities, and problems will be apparent from this disclosure to those of ordinary skill in the art and the same are contemplated within the scope of the illustrative embodiments. Note that proximity of a node to a service can be measured in any manner suitable in a given network. For example, a probe can be closest to the location of the service, or be a threshold distance, such as a specified number of network hops, from the service in the example above within the scope of the illustrative embodiments.

Figure 5:
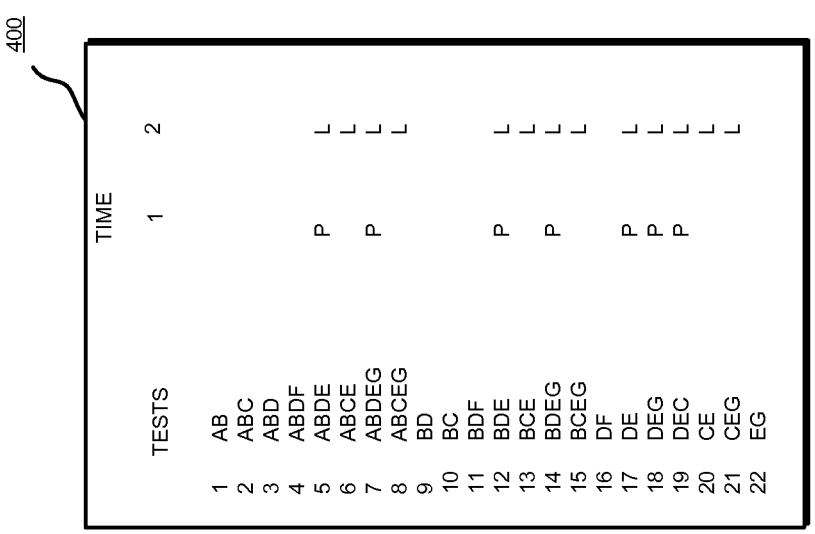
FIG. 5 depicts another table of example results of tests performed for automated network fault location in accordance with an illustrative embodiment.

With reference to FIG. 5, this figure depicts another table of example results of tests performed for automated network fault location in accordance with an illustrative embodiment. Table 500 can be constructed from the results of the tests performed by application 115 in FIG. 1, as described in FIG. 3.

Table 400 in FIG. 4 was created when the communication path from probe A to probe E had probably changed from ABDE to ABCE, due to the non-responsiveness problems in link DE. Table 500 shows test reports when path ABDE remains active, such as when only performance problems are experienced in link DE but link DE is not non-responsive.

An embodiment, such as application 115 in FIG. 1, analyzes table 500 in a manner similar to the analysis process described with respect to table 400. The application can make suggestions about one or more candidate fault locations in a similar manner employing various embodiments.

Figure 6:
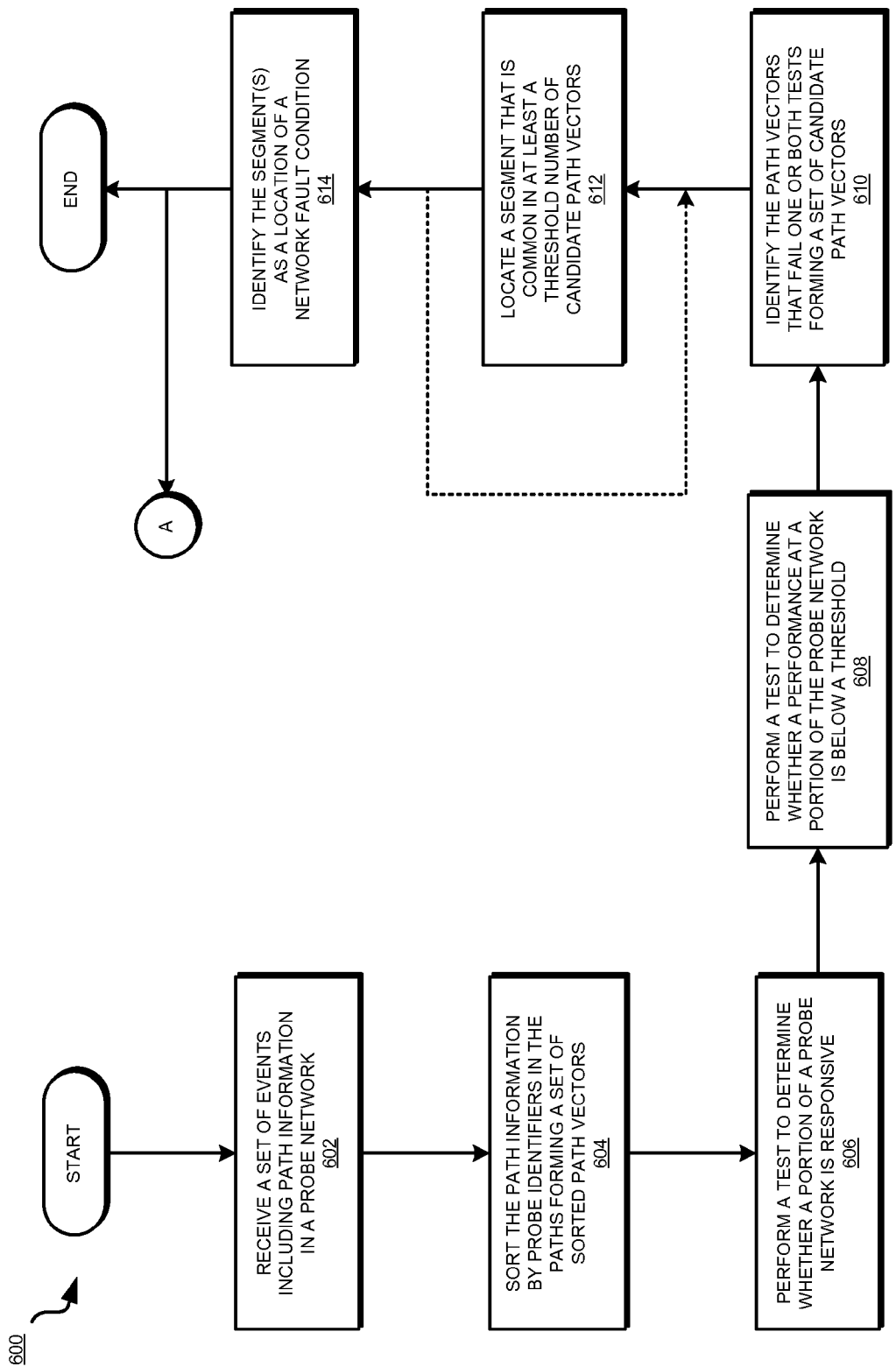
FIG. 6 depicts a flowchart of an example process for automated network fault location in accordance with an illustrative embodiment.

With reference to FIG. 6, this figure depicts a flowchart of an example process for automated network fault location in accordance with an illustrative embodiment. Process 600 can be implemented in application 115 in FIG. 1.

The application receives a set of events, such as events generated by executing Traceroute operation in a network of probes, the events including the path information (step 602). The application sorts the path information according to probe identifiers, lengths, or a combination thereof (step 604). In one embodiment, the sorting of step 604 is optional. In another embodiment, the sorting helps build a tree structure in a table of results such that the candidate segment can be represented as the root of the path vectors for further diagnostic efficiencies.

The application performs a test to determine whether a portion of a network of probes is responsive at all (step 606). The application performs a test to determine whether a portion of the network of probes is experiencing a performance problem such that a performance parameter is below a threshold (step 608). The application can performs only the test of step 606, only the test of step 608, or both tests in a combination, depending on the implementation and circumstances.

The application identifies those path vectors that fail in one or both tests of steps 606 and 608 (step 610). Step 610 results in a set of candidate path vectors that include the candidate segment where the fault is located.

The application locates a segment, for example, the shortest segment of length 2, that is common to at least a threshold number of path vectors in the set of candidate path vectors (step 612). The application may repeat step 612 and may find more than one such segments.

The application identifies the one or more segments as possible locations of a network fault condition (step 614). The application may end process 600 thereafter or may exit via exit point marked "A" to enter process 700 via a corresponding entry point "A" in process 700 in FIG. 7.

Figure 7:
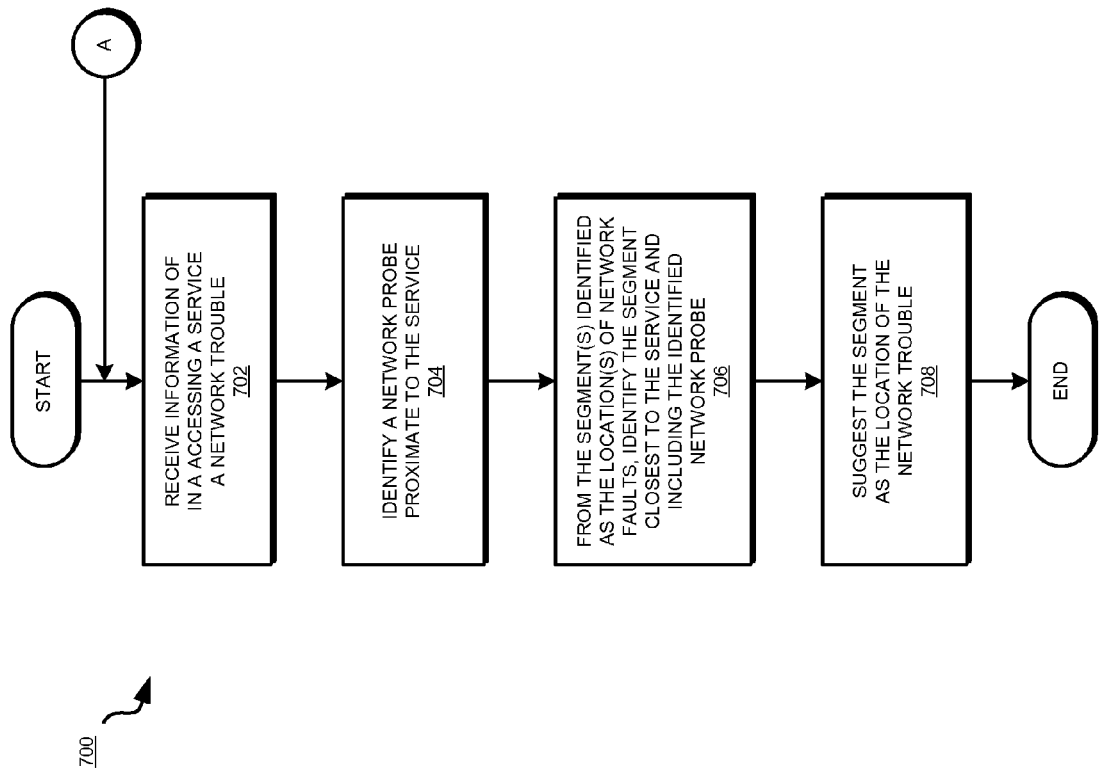
FIG. 7 depicts a flowchart of an example modification to a process for automated network fault location in accordance with an illustrative embodiment.

With reference to FIG. 7, this figure depicts a flowchart of an example modification to a process for automated network fault location in accordance with an illustrative embodiment. Process 700 can be implemented in application 115 in FIG. 1.

The application begins process 700 or enters process 700 via entry point "A". The application receives information about a network trouble in accessing a service in the network (step 702). The application identifies a network probe proximate to the service in an overlaid probe network (step 704).

From the one or more segments identified as candidate locations of the fault, as in step 614 in FIG. 6, the application identifies a segment that is closest to the service and includes the probe identified in step 704 (step 706). The application suggests the segment identified in step 706 as the location of the network trouble (step 708). The application ends process 700 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for automated network fault location in a data processing environment. An embodiment performs an automatic path testing, path analysis, and segment identification to locate one or more candidate segments in a network where conditions giving rise to a network fault may exist.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for locating a network fault, the method comprising:
    configuring, using a processor and a memory, a set of network probes to execute at a corresponding set of networking components in a data network;
    receiving a set of events, wherein an event in the set of events includes a list of network probes in an order those network probes are visited, the list of network probes forming a path in a set of paths;
    performing a test to determine whether a fault condition is present in any of the paths in the set of paths;
    selecting those paths, as a set of candidate paths, where the fault condition is present;
    locating at least one segment of a specified length that is common to a threshold number of paths in the set of candidate paths; and
    suggesting the at least one segment as the location of the network fault.

2. The method of claim 1, further comprising:
    selecting a network probe from the set of network probe, wherein the at least one segment further includes the selected network probe.

3. The method of claim 2, further comprising:
    determining that the network fault comprises trouble in accessing a service executing on a data processing system, wherein the selected network probe is located at a specified distance from the data processing system.

4. The method of claim 1, wherein the test determines whether a link in any path is non-responsive.

5. The method of claim 1, wherein the test determines whether any given path has a performance parameter whose value is lower than a threshold value.

6. The method of claim 1, further comprising:
    tracing data packets through each unique path in the set of paths through the network probes, the tracing through a unique path causing the packet to visit a subset of network probes in a particular order in that unique path; and
    generating the set of events as a result of the tracing the data packets through each unique path.

7. The method of claim 1, further comprising:
    sorting the set of paths by size.

8. The method of claim 1, wherein the network probes communicate with each other to form a network of probes that overlays the data network, removing a need to learn a topography of the data network for fault isolation.

9. The method of claim 1, further comprising:
    identifying a set of networking components in a portion of the data network corresponding to the at least one segment; and
    locating the network fault in a networking component in the set of networking components.

10. A computer program product for locating a network fault, the computer program product comprising:
    one or more computer-readable tangible storage devices;
    program instructions, stored on at least one of the one or more storage devices, to configure, using a processor and a memory, a set of network probes to execute at a corresponding set of networking components in a data network;
    program instructions, stored on at least one of the one or more storage devices, to receive a set of events, wherein an event in the set of events includes a list of network probes in an order those network probes are visited, the list of network probes forming a path in a set of paths;
    program instructions, stored on at least one of the one or more storage devices, to perform a test to determine whether a fault condition is present in any of the paths in the set of paths;
    program instructions, stored on at least one of the one or more storage devices, to select those paths, as a set of candidate paths, where the fault condition is present;
    program instructions, stored on at least one of the one or more storage devices, to locate at least one segment of a specified length that is common to a threshold number of paths in the set of candidate paths; and
    program instructions, stored on at least one of the one or more storage devices, to suggest the at least one segment as the location of the network fault.

11. The computer program product of claim 10, further comprising:
    program instructions, stored on at least one of the one or more storage devices, to select a network probe from the set of network probe, wherein the at least one segment further includes the selected network probe.

12. The computer program product of claim 11, further comprising:
    program instructions, stored on at least one of the one or more storage devices, to determine that the network fault comprises trouble in accessing a service executing on a data processing system, wherein the selected network probe is located at a specified distance from the data processing system.

13. The computer program product of claim 10, wherein the test determines whether a link in any path is non-responsive.

14. The computer program product of claim 10, wherein the test determines whether any given path has a performance parameter whose value is lower than a threshold value.

15. The computer program product of claim 10, further comprising:
    program instructions, stored on at least one of the one or more storage devices, to trace data packets through each unique path in the set of paths through the network probes, the tracing through a unique path causing the packet to visit a subset of network probes in a particular order in that unique path; and
    program instructions, stored on at least one of the one or more storage devices, to generate the set of events as a result of the tracing the data packets through each unique path.

16. The computer program product of claim 10, wherein the program instructions are stored in at least one of the one or more computer-readable tangible storage devices in a data processing system, and wherein the program instructions are transferred over a network from a remote data processing system.

17. The computer program product of claim 10, wherein the program instructions are stored in at least one of the one or more computer-readable tangible storage devices in a server data processing system, and wherein the program instructions are downloaded over a network to a remote data processing system for use in a computer-readable tangible storage device associated with the remote data processing system.

18. A computer system for locating a network fault, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to configure, using a processor and a memory, a set of network probes to execute at a corresponding set of networking components in a data network;

program instructions, stored on at least one of the one or more storage devices for execution by at least one of the one or more processors via at least one of the one or more memories, to receive a set of events, wherein an event in the set of events includes a list of network probes in an order those network probes are visited, the list of network probes forming a path in a set of paths;

program instructions, stored on at least one of the one or more storage devices for execution by at least one of the one or more processors via at least one of the one or more memories, to perform a test to determine whether a fault condition is present in any of the paths in the set of paths;

program instructions, stored on at least one of the one or more storage devices for execution by at least one of the one or more processors via at least one of the one or more memories, to select those paths, as a set of candidate paths, where the fault condition is present;

program instructions, stored on at least one of the one or more storage devices for execution by at least one of the one or more processors via at least one of the one or more memories, to locate at least one segment of a specified length that is common to a threshold number of paths in the set of candidate paths; and program instructions, stored on at least one of the one or more storage devices for execution by at least one of the one or more processors via at least one of the one or more memories, to suggest the at least one segment as the location of the network fault.

* * * * *